(No Model.) 2 Sheets—Sheet 1.

J. M. MORET.
GEARING.

No. 528,641. Patented Nov. 6, 1894.

Witnesses:
E. B. Bolton
H. van Oldenneel

Inventor:
Jean Marie Moret
By Richards
his Attorneys (No Model.) 2 Sheets—Sheet 2.

J. M. MORET.
GEARING.

No. 528,641. Patented Nov. 6, 1894.

Witnesses:
E. B. Bolton
H. van Oldenneel

Inventor:
Jean Marie Moret
By Richards
his Attorneys.

UNITED STATES PATENT OFFICE.

JEAN MARIE MORET, OF BESANÇON, FRANCE.

GEARING.

SPECIFICATION forming part of Letters Patent No. 528,641, dated November 6, 1894.

Application filed February 3, 1894. Serial No. 499,010. (No model.) Patented in France July 20, 1893, No. 231,560.

*To all whom it may concern:*

Be it known that I, JEAN MARIE MORET, a citizen of the French Republic, residing at Besançon, France, have invented certain new and useful Improvements in Gearing; and I do hereby declare the following to be a full, clear, and exact description of the invention, such as will enable others skilled in the art to which it appertains to make and use the same.

The invention has been patented in France, No. 231,560, dated July 20, 1893.

My invention is applicable to all forms of gearing, such as chains, racks or gear wheels and comprises a gearing in which one part has movable teeth and the other part fixed teeth to mesh with the movable or yielding teeth so that one gear may have movement independent of the other.

Figure 1:
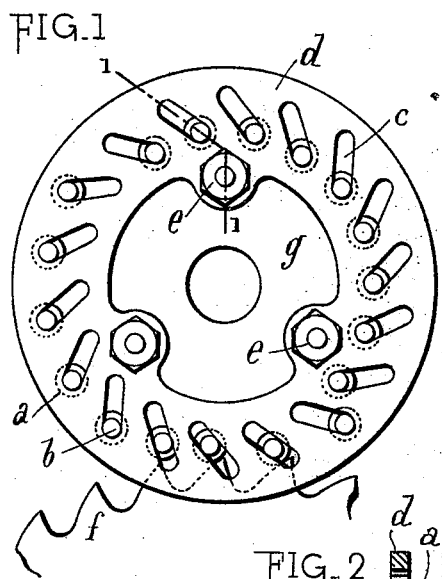
Figure 3:
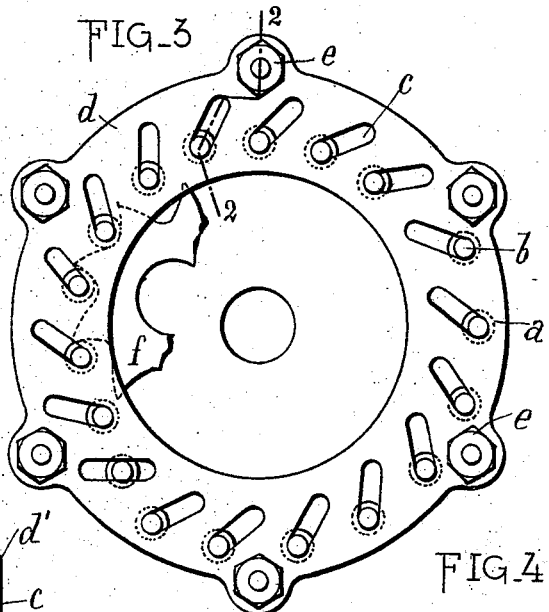
Figure 2:
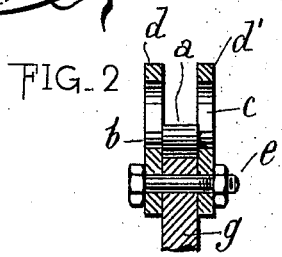
Figure 4:
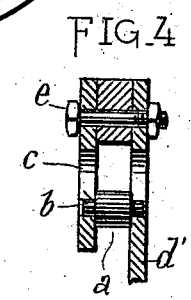
Figure 5:
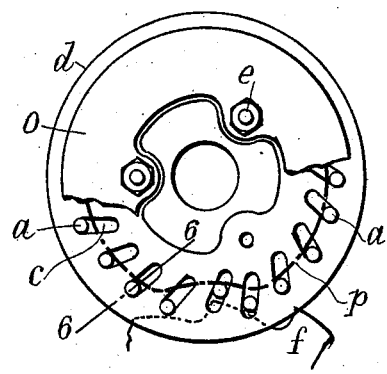
Figure 6:
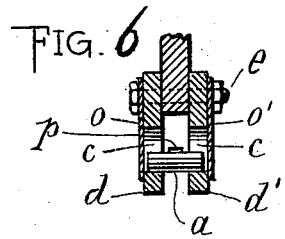
Figure 7:
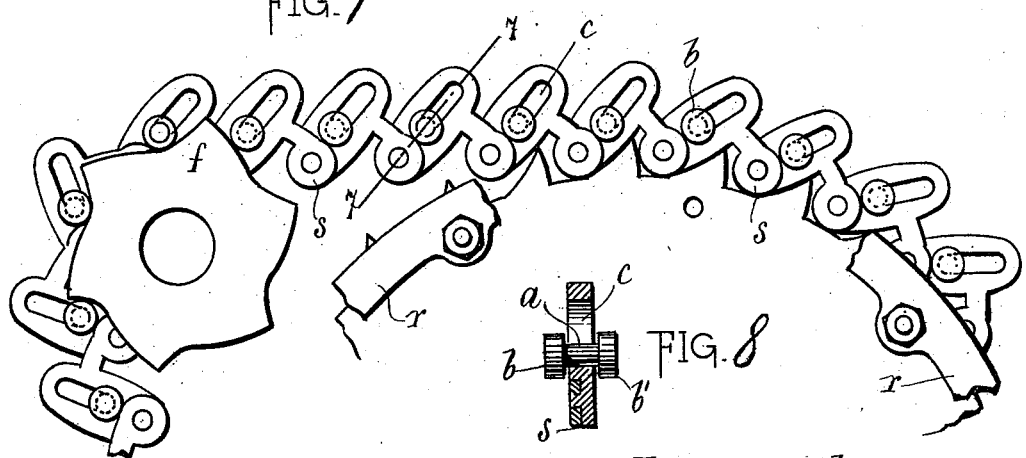
Figure 8:
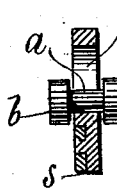

Figure 1 is a front view of a gearing device with movable cogs. Fig. 2, is a sectional view on the line 1—1 of Fig. 1. Fig. 3, is a side view similar to Fig. 1 of a modification. Fig. 4, is a view on line 2—2 of Fig. 3. Fig. 5, is a side view of another modification in which a sliding cog under spring tension is used. Fig. 6, is a section of the same on line 6—6 of Fig. 11. Figs. 7 and 8 are views of a modification showing a flexible chain having sliding pins and adapted to transmit motion from one wheel to another so that the driven wheel may have movement independent of the driving wheel.

The device comprises the cylindrical movable cogs $a$, the extremities $b$ of which are of a reduced diameter to slide in properly inclined grooves made in the crown plates $d\ d'$ connected by means of bolts $e$. The distance between the plates required for the free passage of the cogs or teeth of the companion gear having the fixed cogs $f$ is obtained by means of a disk $g$ or of arms uniting in the center.

As soon as the gearing device with movable cogs is actuated with a greater speed than the gearing device with fixed cogs, the movable cylindrical cogs $a$ are pushed upward, sliding in the grooves $c$ under the action of the gearing device with fixed cogs; after which the cogs $a$ will reassume their gearing position on account of their own weight. The wheel with fixed cogs can thus stop for a a certain time, while the wheel with movable cogs continues its motion on account of its momentum.

In Figs. 3 and 4, the gear $f$ with the fixed teeth is arranged inside of the gear with the movable teeth, the connection or spacing ring between the two plates $d\ d'$ being secured between the periphery of the plates.

In Figs. 5 and 6 the cog $a$ consists of a plain cylinder sliding in two grooves $c$ (as in Figs. 1 and 3). The cylinders are held in said grooves by two cast iron crown plates $o, o'$ fixed to the crown plates $d\ d'$ in which the grooves $c$ are made which are thus closed. This arrangement of gears with movable cylindrical cogs can be placed in a horizontal position on account of a spiral spring $p$ placed inside which maintains every cylindrical cog in its gearing position as long as the same is not driven back by the gearing device with fixed cogs $f$.

Figs. 7, and 8, show a chain with movable cylindrical cams $a$, the middle part of which is of a reduced diameter and slides in a groove $c$. The two extremities $b\ b'$ of each engage with a double or with a grooved pinion with fixed cogs $f$. The other-toothed wheel is simple and carries at each side of its crown plate another crown plate $r$ of cast iron that serves as a guide for the chain which it carries along by its inferior portion $s$.

In all the forms of the invention disclosed it will be noticed that the driven part may be actuated through reciprocation or oscillation of the driver and may have movement independent of the driver due to the momentum acquired therefrom.

I claim—

The improved gearing comprising the slotted part having the rollers or pins movable in said slots and the second part having fixed teeth to engage the movable rollers or pins, said rollers or pins forming the only engaging teeth or cogs with which the slotted part is provided and having movement sufficient to allow them to yield and pass the fixed teeth of the second part of the gearing, whereby the slotted part may slip or move in advance of the second part, substantially as described.

In testimony whereof I affix my signature in presence of two witnesses.

JEAN MARIE MORET.

Witnesses:
 EMILE KANTER,
 EUGÈNE BOUVART.